US012735516B2

(12) United States Patent
Tang et al.

(10) Patent No.: US 12,735,516 B2
(45) Date of Patent: Sep. 15, 2026

(54) ULTRA-LOW TEMPERATURE ELASTOMERIC FLUOROPOLYMER COMPOSITIONS AND PROCESSES FOR PREPARING THE SAME

(71) Applicant: THE CHEMOURS COMPANY FC, LLC, Wilmington, DE (US)

(72) Inventors: Phan Linh Tang, West Chester, PA (US); Peter A Morken, Wilmington, DE (US); Eric Chauvigne, Amancy (FR); Lee Grant Sprague, Augusta, GA (US); Rebecca Jill Dooley, Paoli, PA (US); Benjamin Weaver Messmore, Wilmington, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 1106 days.

(21) Appl. No.: 17/784,819

(22) PCT Filed: Dec. 17, 2020

(86) PCT No.: PCT/US2020/065456
§ 371 (c)(1),
(2) Date: Jun. 13, 2022

(87) PCT Pub. No.: WO2021/127074
PCT Pub. Date: Jun. 24, 2021

(65) Prior Publication Data

US 2023/0015548 A1 Jan. 19, 2023

Related U.S. Application Data

(60) Provisional application No. 62/949,063, filed on Dec. 17, 2019.

(51) Int. Cl.

| | |
|---|---|
| ***C08F 214/26*** | (2006.01) |
| ***C08F 214/22*** | (2006.01) |
| ***C08K 5/14*** | (2006.01) |
| ***C08L 27/16*** | (2006.01) |

(52) U.S. Cl.
CPC ........ *C08F 214/262* (2013.01); *C08F 214/22* (2013.01); *C08K 5/14* (2013.01); *C08L 27/16* (2013.01); *C08F 214/222* (2013.01); *C08F 214/26* (2013.01)

(58) Field of Classification Search
CPC .. C08F 214/22; C08F 214/26; C08F 214/222; C08F 214/262; C08L 27/16
See application file for complete search history.

(56) References Cited

U.S. PATENT DOCUMENTS

| | | | | |
|---|---|---|---|---|
| 3,692,843 | A | 9/1972 | Resnick | |
| 4,243,770 | A | 1/1981 | Tatemoto et al. | |
| 5,696,216 | A | 12/1997 | Kruger et al. | |
| 5,910,552 | A | 6/1999 | Saito et al. | |
| 6,294,627 | B1 | 9/2001 | Worm et al. | |
| 7,148,300 | B2 | 12/2006 | Fukushi | |
| 2004/0181022 | A1 * | 9/2004 | Saito | C08F 214/22 526/247 |
| 2014/0357821 | A1 | 12/2014 | Zhao | |

FOREIGN PATENT DOCUMENTS

| | | | |
|---|---|---|---|
| CN | 107868163 | A | 4/2018 |
| JP | H06329860 | A | 11/1994 |
| WO | 0012574 | A1 | 3/2000 |

OTHER PUBLICATIONS

PCT International Search Report and Written Opinion for International Application No. PCT/US2020/065456 mailed Mar. 23, 2021.

* cited by examiner

*Primary Examiner* — Kregg T Brooks
*Assistant Examiner* — David R. Foss

(57) ABSTRACT

An elastomeric fluoropolymer includes the following monomer units: about 45 mol % to about 65 mol % —$CF_2$—$CH_2$—; about 8 mol % to about 30 mol % —$CF_2$—$CF_2$—; about 4.5 mol % to about 25 mol % —$CF_2$—CF(O—$CF_3$)—; and about 6 mol % to about 20 mol % —$CF_2$—CF(O—$CF_2$—$CF_2$—O—$(CF_2—O)_n$—$CF_3$)—, where n is 1 or 2. In some embodiments, a composition includes an elastomeric fluoropolymer and at least one additive. In some embodiments, a composition includes a first elastomeric fluoropolymer and a second elastomeric fluoropolymer blended with the first elastomeric fluoropolymer. The first elastomeric fluoropolymer includes the following monomer units: about 45 mol % to about 65 mol % —$CF_2$—$CH_2$—; about 8 mol % to about 30 mol % —$CF_2$—$CF_2$—; about 4.5 mol % to about 25 mol % —$CF_2$—CF(O—$CF_3$)—; and about 6 mol % to about 20 mol % —$CF_2$—CF(O—$CF_2$—$CF_2$—O—$(CF_2—O)_n$—$CF_3$)—, where n is 1 or 2.

27 Claims, No Drawings

ULTRA-LOW TEMPERATURE ELASTOMERIC FLUOROPOLYMER COMPOSITIONS AND PROCESSES FOR PREPARING THE SAME

FIELD OF THE INVENTION

The present invention is directed to elastomeric fluoropolymers and methods for preparing elastomeric fluoropolymers. More particularly, the present invention is directed to ultra-low temperature elastomeric fluoropolymers and methods for preparing ultra-low temperature elastomeric fluoropolymers.

BACKGROUND OF THE INVENTION

Fluoroelastomers having excellent heat resistance, oil resistance, and chemical resistance have been used widely for sealing materials, containers, and hoses.

Examples of fluoroelastomers include copolymers with units of vinylidene fluoride (VF2) and units of at least one other copolymerizable fluorine-containing major monomer, such as hexafluoropropylene (HFP), tetrafluoroethylene (TFE), chlorotrifluoroethylene (CTFE), vinyl fluoride (VF), or a fluorovinyl ether such as a perfluoro(alkyl vinyl ether) (PAVE). Specific examples of PAVE monomers include perfluoro(methyl vinyl ether), perfluoro(ethyl vinyl ether) and perfluoro(propyl vinyl ether). Other examples of fluoroelastomers include the copolymers of tetrafluoroethylene with a perfluoro(alkyl vinyl ether) such as perfluoro(methyl vinyl ether) (PMVE).

In order to provide the physical properties necessary for most end use applications, fluoroelastomers are conventionally crosslinked. One curing system for many end uses is the combination of an organic peroxide and a multifunctional unsaturated co-agent. The co-agent forms crosslinks by reacting with cure sites on the polymer chain of the fluoroelastomer. One example of a cure site is an iodine atom bonded to a carbon atom on the fluoroelastomer chain.

U.S. Pat. No. 3,692,843, entitled "Perfluorovinyl Ethers" and issued Sep. 19, 1972, discloses compounds of the formula $CF_3$—O—$(CF_2$—O$)_n$—$CF_2$—$CF_2$—O—CF═$CF_2$ (nVE), where n is an integer of 1 to 5.

U.S. Pat. No. 5,696,216, entitled "Peroxide crosslinkable fluororubbers, a process for the production thereof and use thereof" and issued Dec. 9, 1997 to Kruger et al., discloses peroxide-crosslinkable fluororubbers having crosslinking-active reactive sites and prepared from polymerized units of VF2, one or more fluorinated propenes and/or a fluorinated methyl vinyl ether, one or more perfluoro(polyoxaalkyl vinyl ether) that may be an nVE, and optionally TFE. These fluororubbers have a high VF2 content of 65-82 mol % and lack suitable fluid resistance for use in ultra-low temperature seals.

There is an increasing commercial need for ultra-low temperature seals with a combination of good fluid resistance and low-temperature properties, such as glass transition temperature ($T_g$), 10% temperature retraction (TR10), and 70% temperature retraction (TR70), suitable for use at temperatures below −30° C. To date there has been no disclosure of an elastomeric fluoropolymer including an nVE monomer unit that demonstrates the combination of fluid resistance and low-temperature properties suitable for such industrial application.

BRIEF DESCRIPTION OF THE INVENTION

In an exemplary embodiment, an elastomeric fluoropolymer includes the following monomer units: about 45 mol % to about 65 mol % —$CF_2$—$CH_2$—; about 8 mol % to about 30 mol % —$CF_2$—$CF_2$—; about 4.5 mol % to about 25 mol % —$CF_2$—CF(O—$CF_3$)—; and about 6 mol % to about 20 mol % —$CF_2$—CF(O—$CF_2$—$CF_2$—O—$(CF_2$—O$)_n$—$CF_3$)—, where n is 1 or 2.

In another exemplary embodiment, a composition includes an elastomeric fluoropolymer and at least one additive. The elastomeric fluoropolymer includes the following monomer units: about 45 mol % to about 65 mol % —$CF_2$—$CH_2$—, about 8 mol % to about 30 mol % —$CF_2$—$CF_2$—, about 4.5 mol % to about 25 mol % —$CF_2$—CF(O—$CF_3$)—, and about 6 mol % to about 20 mol % —$CF_2$—CF(O—$CF_2$—$CF_2$—O—$(CF_2$—O$)_n$—$CF_3$)—, where n is 1 or 2.

In another exemplary embodiment, a composition includes a first elastomeric fluoropolymer and a second elastomeric fluoropolymer blended with the first elastomeric fluoropolymer. The first elastomeric fluoropolymer includes the following monomer units: about 45 mol % to about 65 mol % —$CF_2$—$CH_2$—, about 8 mol % to about 30 mol % —$CF_2$—$CF_2$—, about 4.5 mol % to about 25 mol % —$CF_2$—CF(O—$CF_3$)—, and about 6 mol % to about 20 mol % —$CF_2$—CF(O—$CF_2$—$CF_2$—O—$(CF_2$—O$)_n$—$CF_3$)—, where n is 1 or 2.

Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Provided are exemplary ultra-low temperature elastomeric fluoropolymers and methods for preparing ultra-low temperature elastomeric fluoropolymers. Embodiments of the present disclosure, in comparison to compositions of matter and methods not utilizing one or more features disclosed herein, provide an elastomeric fluoropolymer suitable for ultra-low temperature applications and including a glass transition temperature ($T_g$) of −30° C. or less, a 10% temperature retraction (TR10) of −30° C. or less, a 70% temperature retraction (TR70) of −16° C. or less, a temperature retraction difference (ΔTR) of less than 14° C., a volume swell (VS) of less than 28%, a compression set (CS) of less than 50%, a maximum torque ($M_H$) of at least 10 dNm, a Mooney viscosity in the range of about 10 to about 100, or combinations thereof.

As used herein, a glass transition temperature ($T_g$) refers to a temperature determined by differential scanning calorimetry (DSC) using a 10° C./minute heating rate as defined by following the International Organization for Standardization (ISO) 22768:2006 testing protocol.

As used herein, a temperature at which a 10% retraction occurs (TR10) refers to a temperature determined by following the ISO 2921:2005 testing protocol.

As used herein, a temperature at which a 70% retraction occurs (TR70) refers to a temperature determined by following the ISO 2921:2005 testing protocol.

As used herein, a temperature retraction difference (ΔTR) refers to a temperature difference between the TR70 temperature and the TR10 temperature determined by following the ISO 2921:2005 testing protocol.

As used herein, a volume swell (VS) refers to volume change increase percentage upon exposure to an M-15 fluid for 70 hr at 60° C. as determined by following the ISO 1817:2011 testing protocol.

As used herein, a compression set (CS) refers to a percentage change after 70 hr at 200° C. as determined by following the ISO 815-1:2008 testing protocol.

As used herein, a maximum torque ($M_H$) refers to a parameter measured with a moving die rheometer (MDR) for a cure rate of 24 minutes at 177° C., arc 0.5° for non-blends, or for a cure rate 12 minutes at 180° C., arc 0.5° for blends, as determined by following the ISO 6502:1999 testing protocol.

As used herein, Mooney viscosity refers to a parameter measured under conditions ML 1+10 (121° C.) according to ASTM D1646.

As used herein, an ultra-low temperature refers to a temperature of −30° C. or less.

As used herein, mol % of monomer refers to the mol % of the monomer in the fluoropolymer as determined from a combination of $^{1}$H and $^{19}$F nuclear magnetic resonance (NMR) spectroscopy data, as detailed further herein.

As used herein, wt % of iodine or bromine refers to the wt % of iodine or bromine in the fluoropolymer as determined from a combination of $^{1}$H and $^{19}$F NMR spectroscopy data, as detailed further herein.

In some embodiments, an ultra-low temperature elastomeric fluoropolymer is a random tetrapolymer of the following four monomers:

a) vinylidene fluoride (VF2): $CF_2{=}CH_2$ b) tetrafluoroethylene (TFE): $CF_2{=}CF_2$ c) perfluoro methyl vinyl ether (PMVE): $CF_2{=}CF{-}O{-}CF_3$ d) nVE $CF_2{=}CF{-}O{-}CF_2{-}CF_2{-}(CF_2{-}O)_n{-}CF_3$, e) where n=1 or 2.

In some embodiments, the ultra-low temperature elastomeric fluoropolymer has a composition including VF2 in an amount in the range of about 45 mol % to about 65 mol %, alternatively in the range of about 50 mol % to about 65 mol %, alternatively in the range of about 55 mol % to about 65 mol %, alternatively in the range of about 55 mol % to about 60 mol %, or any value, range, or sub-range therebetween.

In some embodiments, the ultra-low temperature elastomeric fluoropolymer has a composition including TFE in an amount in the range of about 8 mol % to about 30 mol %, alternatively in the range of about 10 mol % to about 25 mol %, alternatively in the range of about 10 mol % to about 20 mol %, alternatively in the range of about 15 mol % to about 20 mol %, or any value, range, or sub-range therebetween.

In some embodiments, the ultra-low temperature elastomeric fluoropolymer has a composition including PMVE in an amount in the range of about 4.5 mol % to about 25 mol %, alternatively in the range of about 5 mol % to about 20 mol %, alternatively in the range of about 5 mol % to about 15 mol %, alternatively in the range of about 10 mol % to about 15 mol %, or any value, range, or sub-range therebetween.

In some embodiments, the ultra-low temperature elastomeric fluoropolymer has a composition including 1VE in an amount in the range of about 6 mol % to about 20 mol %, alternatively in the range of about 6 mol % to about 17 mol %, alternatively in the range of about 6 mol % to about 14 mol %, alternatively in the range of about 10 mol % to about 14 mol %, or any value, range, or sub-range therebetween.

In some embodiments, the ultra-low temperature elastomeric fluoropolymer has a composition including 2VE in an amount in the range of about 6 mol % to about 20 mol %, alternatively in the range of about 6 mol % to about 17 mol %, alternatively in the range of about 6 mol % to about 14 mol %, alternatively in the range of about 10 mol % to about 14 mol %, or any value, range, or sub-range therebetween.

In some embodiments, the ultra-low temperature elastomeric fluoropolymer has a composition of about 45 mol % to about 65 mol % of VF2, about 8 mol % to about 30 mol % of TFE, about 4.5 mol % to about 25 mol % of PMVE, and about 6 mol % to about 20 mol % of 1VE.

In some embodiments, the ultra-low temperature elastomeric fluoropolymer has a composition of about 45 mol % to about 65 mol % of VF2, about 8 mol % to about 30 mol % of TFE, about 4.5 mol % to about 25 mol % of PMVE, and about 6 mol % to about 20 mol % of 2VE.

In some embodiments, the ultra-low temperature elastomeric fluoropolymer has a Mooney viscosity in the range of about 10 to about 100, alternatively in the range of about 20 to about 70, alternatively in the range of about 30 to about 60, or any value, range, or sub-range therebetween.

In some embodiments, the ultra-low temperature elastomeric fluoropolymer further includes iodine or bromine bonded to carbon atoms of the fluoropolymer to provide cure sites. In some embodiments, the iodine or bromine is present in the fluoropolymer in an amount, with respect to the weight of the fluoropolymer, in the range of about 0.05 wt % to about 0.4 wt %, alternatively in the range of about 0.1 wt % to about 0.35 wt %, alternatively in the range of about 0.2 wt % to about 0.35 wt %, alternatively in the range of about 0.25 wt % to about 0.3 wt %, or any value, range, or sub-range therebetween.

Iodine or bromine cure sites bonded to terminal carbons of the elastomeric fluoropolymer may be provided by use of an iodine-containing or bromine-containing chain transfer agent such as the diiodoperfluoro-compounds described for the polymerization process below. Iodine or bromine cure sites along the polymer may also be provided by incorporating an iodine-containing or bromine-containing olefin monomer into the fluoropolymer, e.g., iodotetrafluorobutene, as described for the process below. Iodine cure sites are preferred over bromine cure sites for the practice of the present embodiments.

In some embodiments, a semi-batch emulsion polymerization process for preparing an elastomeric fluoropolymer includes pre-emulsifying nVE liquid monomer in a vessel. The process also includes supplying and pressurizing the vessel to a polymerization pressure with TFE gaseous monomer, VF2 gaseous monomer, and PMVE gaseous monomer at a polymerization temperature. The process also includes adding initiator. The process further includes continuously providing the TFE gaseous monomer, the VF2 gaseous monomer, and the PMVE gaseous monomer at the polymerization temperature to maintain the polymerization pressure while forming the tetrapolymer from the nVE liquid monomer, the TFE gaseous monomer, the VF2 gaseous monomer, and the PMVE gaseous monomer.

In some embodiments, the ultra-low temperature elastomeric fluoropolymer is formed by a process that includes charging a vessel with a pre-emulsified nVE liquid monomer, co-polymerizing in the vessel with TFE, VF2, and PMVE co-monomers, stopping the polymerization, removing unreacted liquid nVE monomer by heating to about 70° C. to about 100° C. and sparging with a gas, coagulating, washing the isolated crumb, and drying the isolated crumb polymer.

In some embodiments, the ultra-low temperature elastomeric fluoropolymer is prepared by a semi-batch emulsion polymerization process. In some embodiments, the polymerization is carried out at a temperature in the range of about 0° C. to about 50° C., alternatively in the range of about 30° C. to about 40° C., alternatively in the range of about 34° C. to about 37° C., alternatively about 35° C., or any value, range, or sub-range therebetween, in a well-stirred reaction vessel. In some embodiments, the process includes emulsifying the nVE into a reactor with an aqueous solution containing a fluorosurfactant. During emulsification, an aqueous solution of sodium phosphate dibasic heptahydrate is fed separately into the reactor. The reactor is then heated to a polymerization temperature and then pressurized with a gas monomer mixture of VF2, TFE, and PMVE.

In some embodiments, the process includes then continuously adding an aqueous solution of sodium metabisulfite followed by an aqueous solution of ammonium persulfate during polymerization. The gas monomer mixture is supplied to the reactor to maintain a constant pressure in the range of about 100 psig to about 300 psig, alternatively in the range of about 120 psig to about 200 psig, alternatively in the range of about 140 psig to about 160 psig, alternatively about 150 psig, or any value, range, or sub-range therebetween, throughout the polymerization. After a predetermined amount of gas monomer mixture has been fed, a mixture of the diiodoperfluoro-compounds 1,4-diiodoperfluorobutane, 1,6-diiodoperfluorohexane, 1,8-diiodoperfluorooctane, and 1,10-diiodoperfluorodecane is charged to the reactor. After an additional predetermined amount of the gas monomer mixture has been added, iodotetrafluorobutene is also continuously fed. After a predetermined amount of time and total amount of gas monomer having been supplied to the reactor, monomer addition is discontinued and the reactor is purged of residual gaseous monomer(s). The reaction is preferably purged with VF2, but alternative purge gases, such as, for example, nitrogen or propane, may be used.

As the temperature of polymerization is reduced, the inclusion of thermal initiators is possible but becomes less practical, and redox initiator systems are generally favored. The elastomeric fluoropolymers of the present disclosure are generally prepared by free radical emulsion or suspension polymerization. The polymerization initiators may be any conventional peroxide initiators used in emulsion polymerizations. The polymerization initiators may include, but are not limited to, inorganic peroxides and organic peroxides. Appropriate inorganic peroxides may include, but are not limited to, peroxydisulfates, potassium persulfate, or ammonium persulfate. Appropriate organic peroxides may include, but are not limited to, hydroperoxides, hydrogen peroxide, benzoyl peroxide, or tert-butyl hydroperoxide. In a redox-type initiation, a reducing agent is present in addition to the peroxide. The reducing agent may be any conventional organic or inorganic reducing agents. Appropriate inorganic reducing agents may include, but are not limited to, sodium sulfite, sodium bisulfite, or sodium metabisulfite. Appropriate organic reducing agents may include, but are not limited to, ascorbic acid, oxalic acid, or sulfinic acids.

In some embodiments, the process includes heating the reactor to about 90° C. and sparging with a gas to remove unreacted nVE. The resulting fluoroelastomer latex is coagulated by addition of an aqueous potassium aluminum sulfate solution and the resulting elastomeric fluoropolymer is washed with deionized water. The polymer crumb may then be dried at about 80° C.

In some embodiments, the resulting ultra-low temperature elastomeric fluoropolymer is isolated, filtered, washed, and dried by conventional techniques employed in the elastomeric fluoropolymer manufacturing industry.

In some embodiments, the ultra-low temperature elastomeric fluoropolymer includes bromine or iodine cure sites and is peroxide-curable. In some embodiments, a peroxide-curable composition includes the ultra-low temperature elastomeric fluoropolymer, an organic peroxide, and a co-agent. In some embodiments, the peroxide-curable composition also includes an acid acceptor, such as, for example, a divalent metal hydroxide, a divalent metal oxide, a strongly basic organic amine having a pKa greater than 10, or a combination thereof. Appropriate strongly basic organic amines may include, but are not limited to, 1,8-bis(dimethylamino)naphthalene. Appropriate divalent metal oxides and hydroxides may include, but are not limited to, CaO, $Ca(OH)_2$, $Bi_2O_3$, and MgO.

Appropriate organic peroxides may include, but are not limited to, 1,1-bis(t-butylperoxy)-3,5,5-trimethylcyclohexane; 1,1-bis(t-butylperoxy)cyclohexane; 2,2-bis(t-butylperoxy)octane; n-butyl-4,4-bis(t-butylperoxy)valerate; 2,2-bis(t-butylperoxy)butane; 2,5-dimethylhexane-2,5-dihydroxyperoxide; di-t-butyl peroxide; t-butylcumyl peroxide; dicumyl peroxide; α,α'-bis(t-butylperoxy-m-isopropyl)benzene; 2,5-dimethyl-2,5-di(t-butylperoxy)hexane; 2,5-dimethyl-2,5-di(t-butylperoxy)hexene-3; benzoyl peroxide, t-butylperoxybenzene; 2,5-dimethyl-2,5-di(benzoylperoxy)-hexane; t-butylperoxymaleic acid; and t-butylperoxyisopropylcarbonate. Preferred examples of organic peroxides include 2,5-dimethyl-2,5-di(t-butylperoxy)hexane, dicumyl peroxide, or α,α'-bis(t-butylperoxy-m-isopropyl)benzene. In some embodiments, the amount of organic peroxide is in the range of 0.05 wt % to 5 wt %, alternatively in the range of 0.1 wt % to 3 wt %, based on the weight of the ultra-low temperature elastomeric fluoropolymer. This particular range is selected because if the organic peroxide is present in an amount of less than 0.05 wt %, the vulcanization rate may be insufficient, causing poor mold release. On the other hand, if the organic peroxide is present in amounts of greater than 5 wt %, the compression set of the cured polymer may become unacceptably high. In addition, the organic peroxide may be used singly or in combinations of two or more types.

Co-agents employed in the peroxide-curable composition may include, but are not limited to, polyfunctional unsaturated compounds, such as, for example, triallyl cyanurate, trimethacryl isocyanurate, triallyl isocyanurate, trimethallyl isocyanurate, triacryl formal, triallyl trimellitate, N,N'-m-phenylene bismaleimide, diallyl phthalate, tetraallylterephthalamide, tri(diallylamine)-s-triazine, triallyl phosphite, bis-olefins, such as, for example, $CH_2{=}CH(C_nF_{2n+1})$—$CH{=}CH_2$ (where n=4, 6, or 8), or N,N-diallylacrylamide. In some embodiments, the amount of co-agent is in the range of about 0.1 wt % to about 10 wt %, alternatively in the range of about 0.2 wt % to about 6 wt %, based on the weight of the ultra-low temperature elastomeric fluoropolymer. This particular concentration range is selected because if the co-agent is present in amounts less than about 0.1 wt %, crosslink density of the cured polymer may be unacceptable. On the other hand, if the co-agent is present in amounts above about 10 wt %, it may bloom to the surface during molding, resulting in poor mold release characteristics. The unsaturated compounds may be used singly or as a combination of two or more types.

In some embodiments, a composition including an ultra-low temperature elastomeric fluoropolymer includes one or more additives. Appropriate additives may include, but are not limited to, one or more fillers, such as, for example, carbon black, Austin black, graphite, a thermoplastic fluoropolymer micropowder, silica, clay, diatomaceous earth, talc, wollastonite, calcium carbonate, calcium silicate, calcium fluoride, or barium sulfate; one or more processing aides, such as, for example, higher fatty acid esters, fatty acid calcium salts, fatty acid amides (such as, for example, erucamide), low molecular weight polyethylene, silicone oil, silicone grease, stearic acid, sodium stearate, calcium stearate, magnesium stearate, aluminum stearate, or zinc stearate; and/or one or more coloring agents, such as, for example, titanium white or iron red. In some embodiments, the amount of fillers is in the range of about 0.1 wt % to about 100 wt %, alternatively in the range of about 1 wt % to about 60 wt %, based on the weight of the ultra-low temperature elastomeric fluoropolymer. This range is selected because if the filler is present in amounts of less than about 0.1 wt %, there may be little or no effect, while, on the other hand, if greater than about 100 wt % of filler is used, elasticity may be sacrificed. In some embodiments, the amount of processing aides is less than about 10 wt %, alternatively less than about 5 wt %, based on the weight of the ultra-low temperature elastomeric fluoropolymer. If the amount used is above the limit, heat resistance may be adversely affected. In some embodiments, the amount of coloring agent is less than about 50 wt %, alternatively less than about 30 wt %, based on the weight of the ultra-low temperature elastomeric fluoropolymer. If greater than about 50 wt % coloring agent is used, the compression set may suffer.

In some embodiments, the ultra-low temperature elastomeric fluoropolymer, organic peroxide, co-agent, and any additives are incorporated into the peroxide-curable composition by an internal mixer or rubber mill. The resulting peroxide-curable composition may then be shaped (e.g. molded or extruded) and cured. In some embodiments, curing takes place at a temperature in the range of about 150° C. to about 200° C. for a time period of about 1 minute to about 60 minutes. Conventional rubber curing presses, molds, extruders, and the like having suitable heating and curing capacity may be used. Also, for optimum physical properties and dimensional stability, a post-curing operation may be carried out, where the molded or extruded composition is heated in an oven or the like for an additional time period of about 1 to about 48 hours, at a temperature in the range of about 180° C. to about 275° C., generally in an air atmosphere.

The values for monomer content and iodine content in the elastomeric fluoropolymers are determined based on the following NMR procedures:

The elastomeric fluoropolymer sample is prepared for NMR analysis in a 5 mm NMR tube (Wilmad 528-PP) by dissolving 60-70 mg of polymer overnight in 0.7 mL acetone-$d_6$ (Cambridge Isotope Laboratories, 99.9% D) to which have been added tetramethylsilane (TMS) and 1,3,5-tris(trifluoromethyl)benzene (TFMB) for $^1H$ chemical shift referencing and $^1H/^{19}F$ quantitation, respectively. The $^1H$ and $^{19}F$ resonances from TFMB appear at approximately 8.4 ppm and −64 ppm, respectively, and their 1:3 integral ratio is used to scale the $^1H$ and $^{19}F$ NMR spectra of the sample.

The $^1H$ NMR spectrum of the sample is acquired at 25° C. on a Bruker NEO 600 MHz NMR spectrometer equipped with a 5 mm QCI H/F-C/N-D cryoprobe. The $^1H$ spectrum is acquired using a 90° pulse, acquisition time of 3.5 s, spectral width of 14 ppm, recycle delay of 45 s, and 64 scans. The FID is zero-filled to 131072 points, and exponential line broadening of 0.24 Hz is applied before Fourier transformation. The $^1H$ spectrum of a solvent blank (acetone-$d_6$ with TMS and TFMB) is acquired under the same conditions.

The $^{19}F$ NMR spectrum of the sample is acquired at 25° C. on a Bruker NEO 600 MHz NMR spectrometer equipped with a 5 mm QCI H/F-C/N-D cryoprobe, custom built for low fluorine background. The $^{19}F$ spectrum is acquired using a 30° pulse, acquisition time of 2.5 s, spectral width of 185 ppm, recycle delay of 45 s, and 128 scans (probe S/N is 4000:1 on $^{19}F$). The FID is zero-filled to 524288 points, and exponential line broadening of 0.33 Hz is applied before Fourier transformation. $^{19}F$ chemical shifts are reported relative to the TFMB signal at −64 ppm.

The bulk composition of the elastomeric fluoropolymer is determined from integration of the $^{19}F$ and $^1H$ NMR spectra as follows:

At 600 MHz (564.7 MHz $^{19}F$), the PMVE $OCF_3$ signal and the 1VE $OCF_2OCF_3$ signals are baseline-resolved in the $^{19}F$ spectrum and are integrated without overlap. Proportions of these two monomers (on a molar basis) are determined by dividing the integral of PMVE $OCF_3$ at −54 ppm by 3, and dividing the sum of 1VE $OCF_2OCF_3$ integrals at −55 ppm and −58 ppm by 5.

Using the TFMB $^1H/^{19}F$ resonances to uniformly scale the $^1H/^{19}F$ spectra, the amount of VF2 is determined from the integration of the 4.2 ppm-1.8 ppm region of the $^1H$ spectrum, after subtracting out water and acetone-$d_6$ as measured from the solvent blank, divided by 2.

The amount of TFE is then determined by subtracting the $^{19}F$ area due to the other three monomers from the integration of the $^{19}F$ NMR region between −80 ppm and −150 ppm and dividing by 4. The normalized molar proportions of each monomer are then used to calculate the bulk composition of the elastomeric fluoropolymer in mole percent, which can be converted to weight percent.

Proton signals due to $CF_2CH_2I$ ends appear in the 4.0 ppm to 3.8 ppm region of the $^1H$ NMR spectrum of the elastomeric fluoropolymer as a collection of triplets with $^3J_{(FH)}$ about 18 Hz. Triplet centers upfield of 3.8 ppm are due to $CF_2CH_2OH$ ends, and these signals are not included in the quantitation of $CF_2CH_2I$ ends. If there is any doubt, a standard $^1H$-$^{13}C$ HSQC NMR experiment distinguishes $CF_2CH_2OH$ methylenes ($^{13}C$ at 65 ppm) from $CF_2CH_2I$ methylenes ($^{13}C$ at −3 ppm).

The 4.0 ppm to 3.8 ppm $^1H$ NMR region is integrated with careful attention to slope and bias, as the $CF_2CH_2I$ methylene signals appear on the tail of the main $VF_2$ $^1H$ NMR resonance. Using the TFMB $^1H/^{19}F$ resonances to uniformly scale the $^1H/^{19}F$ spectra, the amount of $CF_2CH_2I$ ends in the polymer sample is determined by dividing the $CF_2CH_2I$ integral by 2 and calculating the ratio of $CF_2CH_2I$ ends in the bulk composition as a mole percent.

Weight percent iodine in the elastomeric fluoropolymer contributed from $CF_2CH_2I$ ends is calculated by converting the mole percent of $CF_2CH_2I$ ends to weight percent of $CF_2CH_2I$ ends, then multiplying by the weight percent of iodine in $CF_2CH_2I$, or 0.665. A similar procedure may be used to determine bromine content when the cure sites are bromine rather than iodine cure sites. In elastomeric fluoropolymer samples with poorly resolved $^1H$ NMR spectra, alternative methods like X-ray fluorescence (XRF) may be used to measure iodine content in the sample.

In some embodiments, the ultra-low temperature elastomeric fluoropolymer is blended with a second elastomeric fluoropolymer. The second elastomeric fluoropolymer may be a perfluoropolymer. In some embodiments, the second elastomeric fluoropolymer is a commercially-available elastomeric fluoropolymer with physical properties not as suitable for ultra-low temperature use as the sole elastomeric fluoropolymer. For example, in some embodiments, the $T_g$ of the second elastomeric fluoropolymer is greater than about −30° C., alternatively greater than about −25° C., alternatively greater than about −20° C., or any value, range, or sub-range therebetween. In some embodiments, the $T_g$ of the second elastomeric fluoropolymer is greater than the $T_g$ of the ultra-low temperature elastomeric fluoropolymer by 5° C., alternatively by 10° C., alternatively by 15° C., alternatively by 20° C., alternatively by 25° C., alternatively by 30° C., or any value, range, or sub-range therebetween. In some embodiments, the second elastomeric fluoropolymer is a terpolymer of VF2, TFE, and PMVE. In some embodiments, the relative amounts of the polymers are selected to provide a predetermined physical parameter, such as, for example, a predetermined glass transition temperature. In some embodiments, the blend has a single glass transition temperature.

The ultra-low temperature elastomeric fluoropolymer may be blended with the second elastomeric fluoropolymer in any relative amount, based on the total weight of the two polymers, such as, for example, in the range of about 20% to about 95%, alternatively in the range of about 60% to about 90%, alternatively in the range of about 60% to about 80%, alternatively in the range of about 60% to about 75%, or any value, range, or sub-range therebetween.

The ultra-low temperature elastomeric fluoropolymer may be useful in various applications.

In some embodiments, the ultra-low temperature elastomeric fluoropolymer may find useful application in a sealing material, a wire coating, a container, a tubing, a laminate, and a hose. In some embodiments, the ultra-low temperature elastomeric fluoropolymer provides reliable sealing at service temperatures across the range of about −60° C. to about 200° C.

In some embodiments, the ultra-low temperature elastomeric fluoropolymer may be used in an o-ring and shaft seal.

In some embodiments, the ultra-low temperature elastomeric fluoropolymer may be used in an automotive seal.

In some embodiments, the ultra-low temperature elastomeric fluoropolymer may be used in a gas processing plant.

In some embodiments, the ultra-low temperature elastomeric fluoropolymer may be used in an oil refinery.

EXAMPLES

The invention is further illustrated by, but is not limited to, the following examples.

Example 1. Formation of Inventive Example 1

Inventive Example 1 was prepared by a semi-batch emulsion polymerization process carried out at 35° C. in a 40-L, well-stirred reaction vessel. A 4167 g quantity of 1VE was emulsified into the reactor with 23 L of an aqueous solution containing 97.8 g of the fluorosurfactant $C_6F_{13}$—$CH_2$—$CH_2$—$SO_3H$, available under the trade designation Capstone™ FS-10 (The Chemours Company, Wilmington, DE). During emulsification, a 2-L solution of water and 141 g of sodium phosphate dibasic heptahydrate was fed separately into the reactor. The reactor was heated to 35° C. and then pressurized to 150 psig with a gas monomer mixture of 62.3 wt % VF2, 15.7 wt % TFE, and 22.0 wt % PMVE. A 39.6-mL aqueous solution of 2 wt % sodium metabisulfite was added continuously at a rate of 10.5 mL/hr followed by a 47.5 mL aqueous solution of 2 wt % ammonium persulfate added continuously at 12.7 mL/hr. A gas monomer mixture of 60 wt % VF2, 22 wt % TFE, and 18 wt % PMVE was supplied to the reactor to maintain a pressure of 150 psig throughout the polymerization. After 20 g of gas monomer mixture had been fed, 7.0 mL of a mixture of 45.9 mol % of 1,4-diiodoperfluorobutane, 41.1 mol % of 1,6-diiodoperfluorohexane, 9.4 mol % of 1,8-diiodoperfluorooctane, and 3.3 mol % of 1,10-diiodoperfluorodecane was charged to the reactor. After 848 g of the gas monomer mixture had been added, iodotetrafluorobutene was also continuously fed at a rate of 14.9 mL per 3000 g of gas monomer mixture fed.

After 9.2 hours and a total of 4167 g of gas monomer having been supplied to the reactor, monomer addition was discontinued and the reactor was purged of residual gaseous monomer(s). The reactor was then heated to 90° C. and sparged with an inert gas (nitrogen) to remove unreacted 1VE. The resulting fluoroelastomer latex was coagulated by addition of an aqueous potassium aluminum sulfate solution and the resulting fluoroelastomer was washed with deionized water. The polymer crumb was dried for 8 hours at 80° C. The resulting Inventive Example 1 was analyzed by NMR spectroscopy, as described above, to determine a polymeric composition of 61.1 mol % of VF2, 17.8 mol % of TFE, 7.5 mol % of PMVE, and 13.6 mol % of 1VE and containing 0.18 wt % of iodine. Inventive Example 1 was an amorphous fluoroelastomer having a glass transition temperature of −45° C., as determined by differential scanning calorimetry (DSC; heating mode, 10° C./minute, inflection point of transition).

Example 2. Comparative Examples

Four comparative examples were formed and evaluated. The comparative examples were formed by the process of Example 1 described above, except with different ratios of monomers. The compositions of these comparative examples are shown in Table 1, as determined by NMR spectroscopy, as described above, after formation of the compositions.

TABLE 1

Compositions of Comparative Examples

| Comparative Example # | VF2 (mol %) | TFE (mol %) | PMVE (mol %) | 1VE (mol %) | Iodine (wt %) | Mooney viscosity |
|---|---|---|---|---|---|---|
| 1 | 65.4 | 8.2 | 17.5 | 8.9 | 0.09 | 63 |
| 2 | 65.0 | 18.1 | 11.3 | 5.6 | 0.23 | 45 |
| 3 | 60.1 | 22.1 | 4.0 | 13.8 | 0.19 | 46 |
| 4 | 44.9 | 39.9 | 6.8 | 8.4 | 0.13 | 77 |

The elastomeric fluoropolymers were compounded on a 2-roll mill with the following components (in parts per 100 parts of polymer, by weight): 30 parts carbon black (medium thermal grade) commercially available under the trade designation "Corax® N990" from Orion Engineered Carbons LLC (Kingwood, TX), 4.2 parts 1,3,5-triallyl-1,3,5-triazine-2,4,6(1H,3H,5H)-trione (72% by weight) on silica carrier commercially available under the trade designation "TAIC DLC®-A" from Natrochem Inc. (Savannah, GA), 2 parts 2,5-dimethyl-2,5-di-(tert-butyl peroxy) hexane (45% by weight) on calcium carbonate/silica carrier commercially available under the trade designation "Varox® DBPH-50" from Vanderbilt Chemicals LLC (Norwalk, CT), 3 parts zinc oxide commercially available under the trade designation "Zoco Grade 102" from Zochem LLC (Dickson, TN), and 0.7 parts of a blend of fatty acid derivatives and waxes containing <25% octadecylamine commercially available under the trade designation "Struktol® HT 290" from Struktol Company of America (Stow, OH); press cured at 177° C. for a time equal to the t90 plus 10 minutes to form o-rings and slabs; then postcured in a circulating air oven at 230° C. for 4 hours. Physical property parameters were measured and recorded for each of the four comparative examples to evaluate their suitability for ultra-low temperature use. The results of these evaluations are shown in Table 2.

TABLE 2

| Properties of Comparative Examples | | | | | | | |
|---|---|---|---|---|---|---|---|
| Comparative Example # | $T_g$ (° C.) | TR10 (° C.) | TR70 (° C.) | ΔTR (° C.) | VS (%) | CS (%) | $M_H$ (dNm) |
| 1 | −40.0 | −40.4 | −32.6 | 8.0 | 30 | 59 | 14.7 |
| 2 | −37.5 | −36.1 | −23.5 | 12.6 | 31 | 28 | 22.4 |
| 3 | −44.2 | −44.0 | −29.0 | 15.0 | 22 | 30 | 19.1 |
| 4 | −31.8 | −26.0 | 0.0 | 26.0 | 15 | 24 | 26.5 |

Comparative Example 1 had a volume swell of 29.5%, which is above the 28% threshold value, and a compression set of 59%, which is above the 50% threshold value. Comparative Example 2 had a volume swell of 31.0%, which is above the 28% threshold value. Comparative Example 3 had a temperature retraction difference of 15° C., which is above the 14° C. threshold value. Comparative Example 4 had a 10% temperature retraction of −26° C., which is above the −30° C. threshold value, a 70% temperature retraction of 0.0° C., which is above the −16° C. threshold value, and a temperature retraction difference of 26° C., which is above the 14° C. threshold value.

Each of the comparative examples had a composition with at least one monomer outside of the range of 45-65 mol % for VF2, 8-30 mol % for TFE, 4.5-25 mol % for PMVE, and 6-20 mol % for 1VE.

Example 3. Inventive Examples

Eight inventive examples were formed and evaluated in addition to Inventive Example 1 and were formed by a process similar to Example 1 described above, except with different ratios of monomers. The compositions of these nine inventive examples are shown in Table 3, as determined by NMR spectroscopy, as described above, after formation of the compositions.

TABLE 3

| Compositions of Inventive Examples | | | | | | |
|---|---|---|---|---|---|---|
| Inventive Example # | VF2 (mol %) | TFE (mol %) | PMVE (mol %) | 1VE (mol %) | Iodine (wt %) | Mooney viscosity |
| 1 | 61.1 | 17.8 | 7.5 | 13.6 | 0.18 | 42 |
| 2 | 62.7 | 8.3 | 17.7 | 11.3 | 0.25 | 35 |
| 3 | 64.9 | 11.7 | 13.0 | 10.4 | 0.20 | 87 |
| 4 | 59.7 | 22.1 | 5.5 | 12.7 | 0.21 | 53 |
| 5 | 61.3 | 20.7 | 4.9 | 13.1 | 0.20 | 52 |
| 6 | 59.4 | 21.1 | 5.2 | 14.4 | 0.21 | 41 |
| 7 | 57.2 | 21.3 | 11.4 | 10.1 | 0.17 | 60 |
| 8 | 54.5 | 26.2 | 11.8 | 7.5 | 0.20 | 70 |
| 9 | 62.5 | 16.9 | 7.7 | 13.0 | 0.18 | 40 |

The inventive example elastomeric fluoropolymers were compounded on a 2-roll mill in the same manner and with the same amounts of other components as the comparative example elastomeric fluoropolymers. Physical property parameters were measured and recorded for each of the nine inventive examples to evaluate their suitability for ultra-low temperature use. The results of these evaluations are shown in Table 4.

TABLE 4

| Properties of Inventive Examples | | | | | | | |
|---|---|---|---|---|---|---|---|
| Inventive Example # | $T_g$ (° C.) | TR10 (° C.) | TR70 (° C.) | ΔTR (° C.) | VS (%) | CS (%) | $M_H$ (dNm) |
| 1 | −45.1 | −44.4 | −37.0 | 7.4 | 25 | 27 | 17.0 |
| 2 | −41.6 | −41.8 | −34.6 | 7.0 | 24 | 32 | 16.8 |
| 3 | −41.0 | −42.1 | −35.0 | 7.0 | 27 | 33 | 17.0 |
| 4 | −43.4 | −43.0 | −30.0 | 13.0 | 22 | 28 | 19.6 |
| 5 | −44.8 | −43.4 | −33.7 | 9.7 | 24 | 29 | 18.7 |
| 6 | −45.0 | −45.0 | −36.9 | 8.1 | 23 | 25 | 18.6 |
| 7 | −39.3 | −37.8 | −31.8 | 6.0 | 21 | 25 | 19.4 |
| 8 | −35.1 | −35.6 | −27.7 | 7.9 | 22 | 24 | 21.6 |
| 9 | −44.2 | −44.3 | −37.7 | 6.6 | 25 | 31 | 16.9 |

Each of the nine inventive examples had a glass transition temperature, a 10% temperature retraction, a 70% temperature retraction, a temperature retraction difference, a volume swell, a compression set, and a maximum torque within the predetermined ranges for use as an ultra-low temperature elastomeric fluoropolymer.

Each of the nine inventive examples had a composition in the range of 45-65 mol % VF2, 10-30 mol % TFE, 4.5-25 mol % PMVE, and 6-20 mol % 1VE.

Example 4. Blends

Inventive Example 9 was blended in various ratios with a commercial fluoroelastomer to evaluate the suitability of such blends for low temperature and/or ultra-low temperature use. The commercial fluoroelastomer was Viton™ GFLT-200S (The Chemours Company, Wilmington, DE). Viton™ GFLT-200S is a terpolymer of VF2, TFE, and PMVE having a $T_g$ of −23° C.

The tested blends included 100%, 75%, 63%, and 50% of Inventive Example 9, by weight. The elastomeric fluoropolymers were compounded on a 2-roll mill with the following components (in parts by weight per 100 parts of polymer): 30 parts carbon black (medium thermal grade) commercially available as "MT Thermax Floform N 990" from Cancarb Limited (Medicine Hat, Alberta, Canada), 3 parts 1,3,5-triallyl-1,3,5-triazine-2,4,6(1H,3H,5H)-trione commercially available as "Rubber chem Diak no 7" from The Chemours Company (Wilmington, DE), 2.2 parts 2 2,5-dimethyl-2,5-di-(tert-butyl peroxy) hexane (45% by weight) on calcium carbonate/silica carrier commercially available under the trade designation "Luperox® 101 XL 45" from Arkema (Colombes, France), 3 parts zinc oxide (ReagentPlus 99.9% 5 micron) commercially available from Sigma-Aldrich Corp. (St. Louis, MO), and 0.7 parts Struktol® HT 290 a blend of fatty acid derivatives and waxes containing <25% octadecylamine; press cured at 180° C. for a time equal to the t90 plus 10 minutes to form o-rings and slabs; then postcured in a circulating air oven at 230° C. for 4 hours. Physical property parameters were measured and recorded for each of the blends to evaluate their suitability for ultra-low temperature use. The results of these evaluations are shown in Table 5.

TABLE 5

Properties of Blends

| IE 9 (%) | $T_g$ (° C.) | TR10 (° C.) | TR70 (° C.) | ΔTR (° C.) | TS (MPa) | EAB (%) | M@100% (MPa) | CS (%) |
|---|---|---|---|---|---|---|---|---|
| 100 | −43.5 | −44 | −36 | 8 | 13.5 | 227 | 2.9 | 22 |
| 75 | −41.5 | −38 | −29 | 9 | 15.1 | 239 | 3.3 | 22 |
| 63 | −38.5 | −35 | −27 | 8 | 15.8 | 242 | 3.4 | 21 |
| 50 | N/A | −32 | −25 | 7 | 16.0 | 217 | 4.0 | 21 |

Each of the blends had a single glass transition temperature, except for the 50:50 blend. As shown in Table 5, TR10 and TR70 values both decreased with decreasing Inventive Example 9 content.

Each of the blends was also tested at a temperature of 23° C. for tensile strength (TS), elongation at break (EAB), and modulus at 100% (M@100%) following the ISO 37:2005 Cor 1 2008 testing protocol. As shown in Table 5, measured tensile strengths were in the range of 13.5 to 16.0 MPa, increasing with decreasing Inventive Example 9 content. Measured elongation at break increased from 227% to 239% to 242% with decreasing Inventive Example 9 content before decreasing to 217% for the 50:50 blend. Measured modulus at 100% values were in the range of 2.9 to 4.0 MPa, increasing with decreasing Inventive Example 9 content.

The low temperature compression set of the blends was measured under two different conditions: after 24 hours at −20° C. (24/−20) and after 24 hours at −30° C. (24/−30). The results of these evaluations are shown in Table 6.

TABLE 6

Low Temperature Compression Set of Blends

| Condition | Time (min) | Compression Set (%) 100:0 | 75:25 | 63:37 | 50:50 |
|---|---|---|---|---|---|
| 24/−20 | 1 | 27 | 33 | 33 | 41 |
| | 3 | 24 | 26 | 29 | 35 |
| | 10 | 21 | 23 | 26 | 29 |
| | 30 | 21 | 22 | 26 | 27 |
| 24/−30 | 1 | N/A | 52 | 66 | N/A |
| | 3 | 33 | 50 | 61 | 66 |
| | 10 | 32 | 45 | 44 | 56 |
| | 30 | 29 | 30 | 36 | 45 |

Despite having a large component of the commercial fluoroelastomer, the blends showed surprisingly good low temperature properties, as evidenced by the low TR and low T compression set data.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An elastomeric fluoropolymer comprising the following monomer units:

about 45 mol % to about 65 mol % —CF2-CH2-;

about 8 mol % to about 30 mol % —CF2-CF2-;

about 4.5 mol % to about 25 mol % —CF2-CF(O—CF3)-; and about 6 mol % to about 20 mol % —CF2-CF(O—CF2-CF2-O—(CF2-O)n-CF3)-, wherein n is 1 or 2.

2. The elastomeric fluoropolymer of claim 1, wherein the elastomeric fluoropolymer is a random tetrapolymer.

3. The elastomeric fluoropolymer of claim 1, wherein n is 1.

4. The elastomeric fluoropolymer of claim 1, wherein n is 2.

5. The elastomeric fluoropolymer of claim 1 further comprising iodine or bromine cure sites.

6. The elastomeric fluoropolymer of claim 5 further comprising iodine or bromine in an amount in the range of about 0.05 wt % to about 0.4 wt %.

7. The elastomeric fluoropolymer of claim 6, wherein at least some of the iodine or bromine is bonded to terminal carbon atoms of the elastomeric fluoropolymer.

8. The elastomeric fluoropolymer of claim 5, wherein at least some of said iodine or bromine is provided by the elastomeric fluoropolymer further comprising monomer units of iodine-containing or bromine-containing olefin.

9. The elastomeric fluoropolymer claim 1, wherein the elastomeric fluoropolymer has a glass transition temperature of −30° C. or less.

10. The elastomeric fluoropolymer of claim 1, wherein after curing, the elastomeric fluoropolymer has a 10% temperature retraction of −30° C. or less.

11. The elastomeric fluoropolymer of claim 1, wherein after curing, the elastomeric fluoropolymer has a 70% temperature retraction of −16° C. or less.

12. The elastomeric fluoropolymer of claim 1, wherein after curing, the elastomeric fluoropolymer has a temperature retraction difference of less than 14° C.

13. The elastomeric fluoropolymer of-claim 1, wherein after curing, the elastomeric fluoropolymer has a volume swell of less than 28%.

14. The elastomeric fluoropolymer of claim 1, wherein after curing, the elastomeric fluoropolymer has a compression set of less than 50%.

15. The elastomeric fluoropolymer of claim 1, wherein the elastomeric fluoropolymer has a Mooney viscosity in the range of about 10 to about 100.

16. A composition comprising:

an elastomeric fluoropolymer comprising the following monomer units:

about 45 mol % to about 65 mol % —CF2-CH2-;

about 8 mol % to about 30 mol % —CF2-CF2-;

about 4.5 mol % to about 25 mol % —CF2-CF(O—CF3)-; and about 6 mol % to about 20 mol % —CF2-CF(O—CF2-CF2-O—(CF2-O)n-CF3)-, wherein n is 1 or 2; and at least one additive.

17. The composition of claim 16, wherein the at least one additive is selected from the group consisting of at least one filler, at least one processing aide, at least one coloring agent, and a combination thereof.

18. The composition of claim 16, wherein the at least one additive comprises a peroxide curing agent.

19. The composition of claim 18, wherein the peroxide curing agent is an organic peroxide.

20. The composition of claim 16, wherein the elastomeric fluoropolymer further comprises iodine or bromine cure sites.

21. A composition comprising:

a first elastomeric fluoropolymer comprising the following monomer units:

about 45 mol % to about 65 mol % —CF2-CH2-;

about 8 mol % to about 30 mol % —CF2-CF2-;

about 4.5 mol % to about 25 mol % —CF2-CF(O—CF3)-; and about 6 mol % to about 20 mol % —CF2-CF(O—CF2-CF2-O—(CF2-O)n-CF3)-, wherein n is 1 or 2; and a second elastomeric fluoropolymer blended with the first elastomeric fluoropolymer.

22. The composition of claim 21, wherein the first elastomeric fluoropolymer further comprises iodine or bromine cure sites.

23. The composition of claim 21, wherein the second elastomeric fluoropolymer comprises a terpolymer of vinylidene fluoride, tetrafluoroethylene, and perfluoro methyl vinyl ether.

24. The composition of claim 21, wherein the first elastomeric fluoropolymer has a glass transition temperature of −30° C. or less.

25. The composition of claim 21, wherein the second elastomeric fluoropolymer has a glass transition temperature of greater than about −30° C.

26. The composition of claim 21, wherein the first elastomeric fluoropolymer and the second elastomeric fluoropolymer are combined in amounts selected to provide a predetermined glass transition temperature for the composition.

27. The composition of claim 21, wherein the composition has a single predetermined glass transition temperature.

* * * * *